United States Patent Office 3,267,311
Patented August 16, 1966

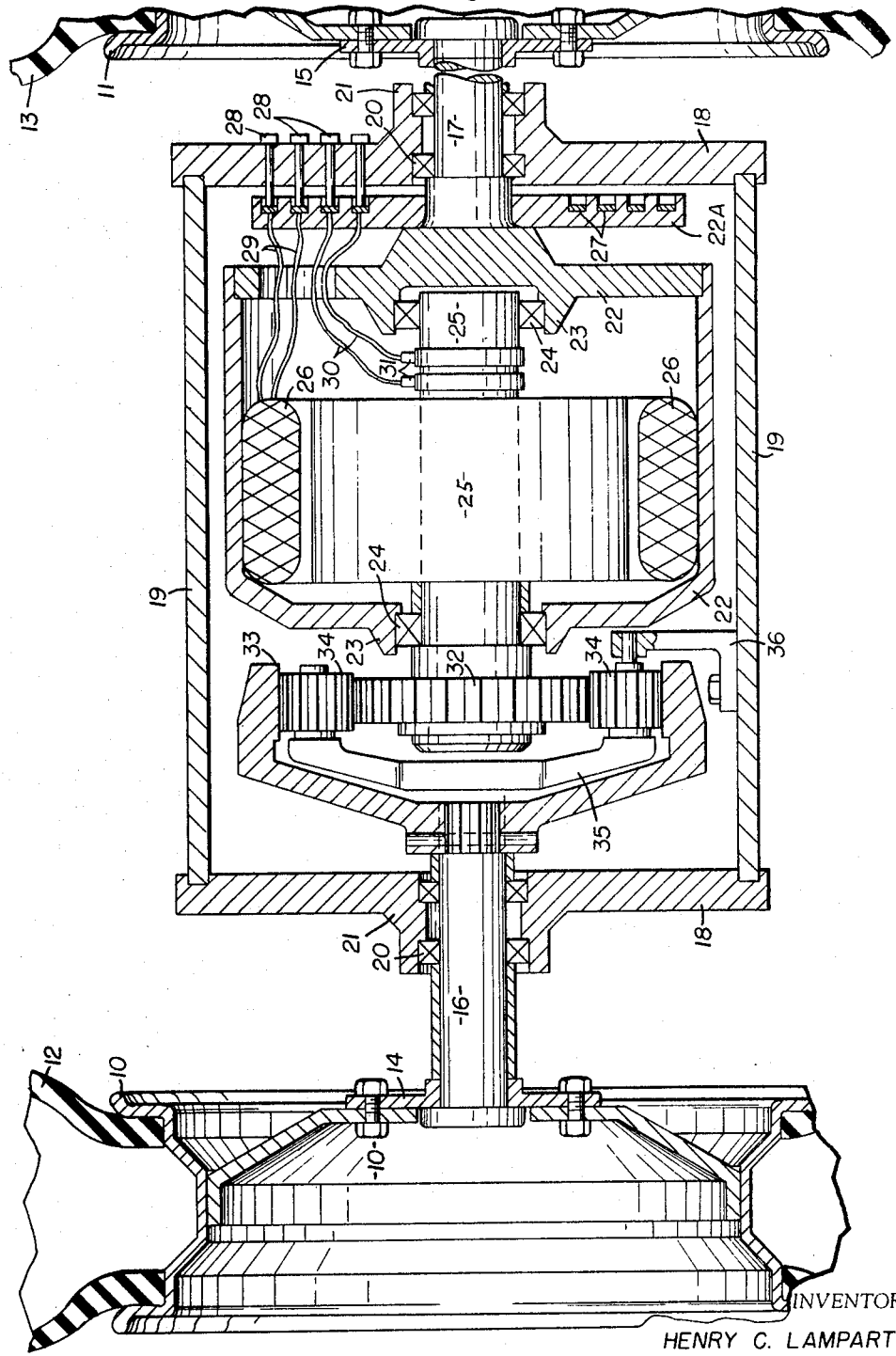

3,267,311
COMBINATION ELECTRIC MOTOR AND DIFFERENTIAL DRIVE FOR VEHICLES
Henry C. Lamparty, 1201 South Ave., Youngstown, Ohio
Filed Aug. 19, 1963, Ser. No. 302,970
1 Claim. (Cl. 310—115)

This invention relates to an electric motor and differential combination drive and more particularly to a device which may be incorporated in an axle of a vehicle so as to drive the vehicle through the axle.

A further object of the invention is the provision of an electric motor and differential which occupies a minimum of space and permits suitable differential action between the driven wheels.

A still further object of the invention is the provision of a combination electric motor and differential device which may be connected between two stub axles carrying ground engaging wheels so as to suitably drive the same.

The combination electric motor and differential disclosed herein is particularly suitable for small vehicles, such as golf carts, which are electric powered from storage batteries and are used in a relatively limited manner, for example around a golf course.

The golf cart constructions heretofore known have provided conventional axle and differential and drive shaft propulsion means with an electric motor of a conventional type driving the drive shaft. The present invention incorporates the electric motor in a differential unit including a planetary gear set and positions the unit between a pair of stub axles on which the ground engaging wheels are mounted. The complete electric motor, including the armature and field housing rotates within a stationary casing in which the stub axles are journalled. The housing with the fields is secured to one of the stub axles while the armature is secured to the opposite axle by way of a planetary gear set, including a single sun gear, a pair of planet gears engaged therewith and engaged within an internal gear which in turn is attached to the stub axle. The arrangement of the planet gear set is such that the speed of revolution of the armature is approximately five times faster than the wheel housing with the planet gear set making the necessary gear reduction.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

The figure is a horizontal section through the device with parts broken away and parts in cross section.

By referring to the drawings, it will be seen that a pair of ground engaging wheels 10 and 11 are of a type having pneumatic tires 12 and 13 thereon which are detachably mounted on hubs 14 and 15 which are secured to axles 16 and 17 respectively. A stationary housing comprising end walls 18, 18 and a cylindrical wall 19 is journalled by bearings 20, 20 on the axles 16 and 17 and the journal structures 21, 21 are arranged to support a vehicle as will be understood by those skilled in the art. The axle 17 extends inwardly of the stationary housing defined by the end walls 18 and cylindrical wall 19 and is attached axially to a field housing 22 which in turn has journal structures 23, 23 including bearings 24, 24 which engage the ends of an armature 25.

Field coils 26 are mounted circumferentially within the field housing 22 and secured thereto as will be understood by those skilled in the art. A disc 22A is secured to one end of the field housing 22 and carries a plurality of annular contact strips 27, 27 which are in turn engaged by a plurality of spring urged brushes 28, 28 which are positioned in one of the end walls 18 of the stationary housing. Flexible conductors 29, 29 extend from a pair of the contact strips 27 to the field coils 26 and another pair of flexible conductors 30 extend from the other contact strips 27 to the armature brushes 31.

Thus, electrical energy connected to the outer ends of the brushes 28, 28 will be suitably delivered to the field coil and armature brushes of the electric motor so that the same may be energized and operated.

In the invention disclosed, such energization will, for example, result in the rotary motion of the field housing 22 and field coils 26 in clockwise direction, while the armature 25 will revolve in an opposite or counter clockwise direction. The field housing 22 being secured to the axle 17 will therefore impart clockwise rotation to the same and to the wheel 11. The armature 25 extends outwardly through the field housing 22 and has a sun gear 32 secured thereto. An offset internal gear 33 is attached on its axial center line to the axle 16 with the offset portion of the internal gear 33 in transverse alignment with the sun gear 32. A pair of planet gears 34, 34 revolvably mounted on the planet gear carrier 35 are positioned in oppositely disposed relation between the sun gear 32 and the internal gear 33 and in matching engagement therewith.

A bracket 36 secured to the planet gear carrier 35 secures the same in fixed relation to the stationary housing 19, and it will thus be seen that the planet gears 34, 34 while free to revolve are maintained in fixed position relative to the stationary housing comprising the end walls 18 and cylindrical wall 19 which was heretofore described.

In the invention herein described, counter clockwise motion of the armature 25 will impart similar counter clockwise motion to the sun gear 32. This motion will be reversed to clockwise motion by the planet gears 34 engaging the internal gear 33 so that the internal gear 33 and the axle 16 will rotate in clockwise direction when the electric motor is energized.

It will also be seen that the planet gears 34 make possible the rotation of the axles 16 and 17 in the same direction and at the same time provide for differential action when the wheels 10 and 11 rotate at different rates of speed as when a vehicle thereon turns a corner. The principal point of invention is therefore in the combination of the electric motor arranged so that its field coils and field case are revolvable and connected to one axle while its armature is connected through the planet gear set to the other axle thereby affording both a gear reduction unit and a differential action along with the motive power source.

It will be seen that a combination electric motor and differential drive for vehicles has been disclosed, and having thus described my invention, what I claim is:

A combination power source and differential for a vehicle axle construction and including a stationary housing, a pair of spaced axially aligned axles journalled in said housing and extending axially outwardly therefrom, field coils and housing of an electric motor secured to one of said axles and rotatably positioned within said stationary housing, an offset internal gear affixed to the other one of said axles and within said stationary housing, an armature rotatably disposed axially in said field coil housing and extending outwardly thereof and within said stationary housing, a sun gear secured to said outward portion of said armature and a pair of planet gears positioned between said sun gear and said offset internal gear and in mesh therewith and a planet gear carrier mounting said planet gears in fixed relation to said stationary housing and means for establishing electrical circuits with said armature and said field coils and a source of electrical energy.

References Cited by the Examiner

UNITED STATES PATENTS

| | | | |
|---|---|---|---|
| 424,818 | 4/1890 | Perret | 310—115 |
| 2,462,182 | 2/1949 | Guerdan et al. | 310—115 |
| 2,564,741 | 8/1951 | Vermillion | 310—118 |

MILTON O. HIRSHFIELD, *Primary Examiner.*

ORIS L. RADAR, *Examiner.*

L. L. SMITH, *Assistant Examiner.*